United States Patent
Bandi et al.

(10) Patent No.: US 11,741,253 B2
(45) Date of Patent: Aug. 29, 2023

(54) OPERATING SYSTEM SERVICE SANITIZATION OF DATA ASSOCIATED WITH SENSITIVE INFORMATION

(71) Applicant: HEWLETT PACKARD ENTERPRISE DEVELOPMENT LP, Houston, TX (US)

(72) Inventors: Sridhar Bandi, Karnataka (IN); Suhas Shivanna, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 629 days.

(21) Appl. No.: 16/262,998

(22) Filed: Jan. 31, 2019

(65) Prior Publication Data
US 2020/0250334 A1  Aug. 6, 2020

(51) Int. Cl.
*G06F 21/62* (2013.01)
*G06F 21/60* (2013.01)
*G06F 12/14* (2006.01)
*G06F 8/41* (2018.01)

(52) U.S. Cl.
CPC ...... *G06F 21/6245* (2013.01); *G06F 12/1408* (2013.01); *G06F 12/1441* (2013.01); *G06F 21/602* (2013.01); *G06F 8/41* (2013.01)

(58) Field of Classification Search
CPC ............. G06F 12/0246; G06F 12/1408; G06F 12/1441; G06F 21/602; G06F 21/6245; G06F 21/6254; G06F 21/78; G06F 2212/7201; G06F 2221/2143; G06F 8/41
See application file for complete search history.

(56) References Cited

U.S. PATENT DOCUMENTS

| | | | |
|---|---|---|---|
| 8,069,053 B2 | 11/2011 | Gervais | |
| 9,465,954 B1* | 10/2016 | Speedie | G06F 21/6227 |
| 9,965,648 B1 | 5/2018 | Cheng | |
| 2004/0187023 A1* | 9/2004 | Alagna | G06F 21/56 726/24 |
| 2004/0255299 A1* | 12/2004 | Brenner | G06F 9/4843 718/102 |
| 2009/0132419 A1* | 5/2009 | Grammer | G06F 21/6245 705/50 |
| 2012/0317423 A1* | 12/2012 | Dolgunov | H04L 9/0894 713/190 |
| 2015/0161397 A1 | 6/2015 | Cook | |
| 2015/0172310 A1 | 6/2015 | Saxena | |
| 2015/0248564 A1* | 9/2015 | Feng | G06F 8/54 726/26 |
| 2016/0232159 A1* | 8/2016 | Parikh | G06F 21/6245 |

(Continued)

OTHER PUBLICATIONS

"Cleaning Up Orphaned Data From Segment Batch Processing Jobs," Retrieved Oct. 15, 2018, <https://docs.oracle.com/cd/E92519_01/pt856pbr2/eng/pt/tibm/task_CleaningUpOrphanedDatafromSegmentBatchProcessingJobs-237f1f.html, 2 pp.

(Continued)

*Primary Examiner* — Theodore C Parsons
(74) *Attorney, Agent, or Firm* — Trop, Pruner & Hu, P.C.

(57) ABSTRACT

A technique includes, in response to an exception occurring in the execution of a process on a computer, invoking an operating system service. The operating system service is used to sanitize data that is associated with the process and is stored in a memory of the computer. The data is associated with sensitive information.

25 Claims, 5 Drawing Sheets

(56) References Cited

U.S. PATENT DOCUMENTS

2016/0357470 A1* 12/2016 Hamaguchi ......... G06F 21/6281
2017/0132420 A1*  5/2017 Shetty ..................... G09C 1/04
2018/0373895 A9* 12/2018 Durham .................. G06F 21/53
2019/0065780 A1*  2/2019 Joisha ................. G06F 11/0778

OTHER PUBLICATIONS

Chris Unwin, "How to Automatically Provision Sanitized Data Using SQLClone, Data Masker and Powershell," Dec. 19, 2017, <https://www.red-gate.com/hub/product-learning/sql-clone/how-to-automatically-provision-sanitized-data-using-sql-clone-data-masker-and-powershell, 8 pp.
Jon Tanguy, "How to securely erase Micron® SATA SSDs—why data sanitization matters," Mar. 14, 2017, <https://www.micron.com/about/blogs/2017/march/how-to-securely-erase-micron-sata-ssds, 6 pp.

* cited by examiner

OPERATING SYSTEM SERVICE SANITIZATION OF DATA ASSOCIATED WITH SENSITIVE INFORMATION

BACKGROUND

At any given time, a computer system may store data that represents personally identifiable information (PII), such as data that represents credit card numbers, social security numbers, salaries, health records, and so forth. Business organizations that collect, process and/or store such data may implement safeguard measures to prevent unauthorized access to PII data. Moreover, certain governmental regulations, such as the General Data Protection Regulation (GDPR) in the European Union (EU), may impose a duty on business organizations to implement measures to protect against unlawful access to PII data.

DETAILED DESCRIPTION

Figure 1:
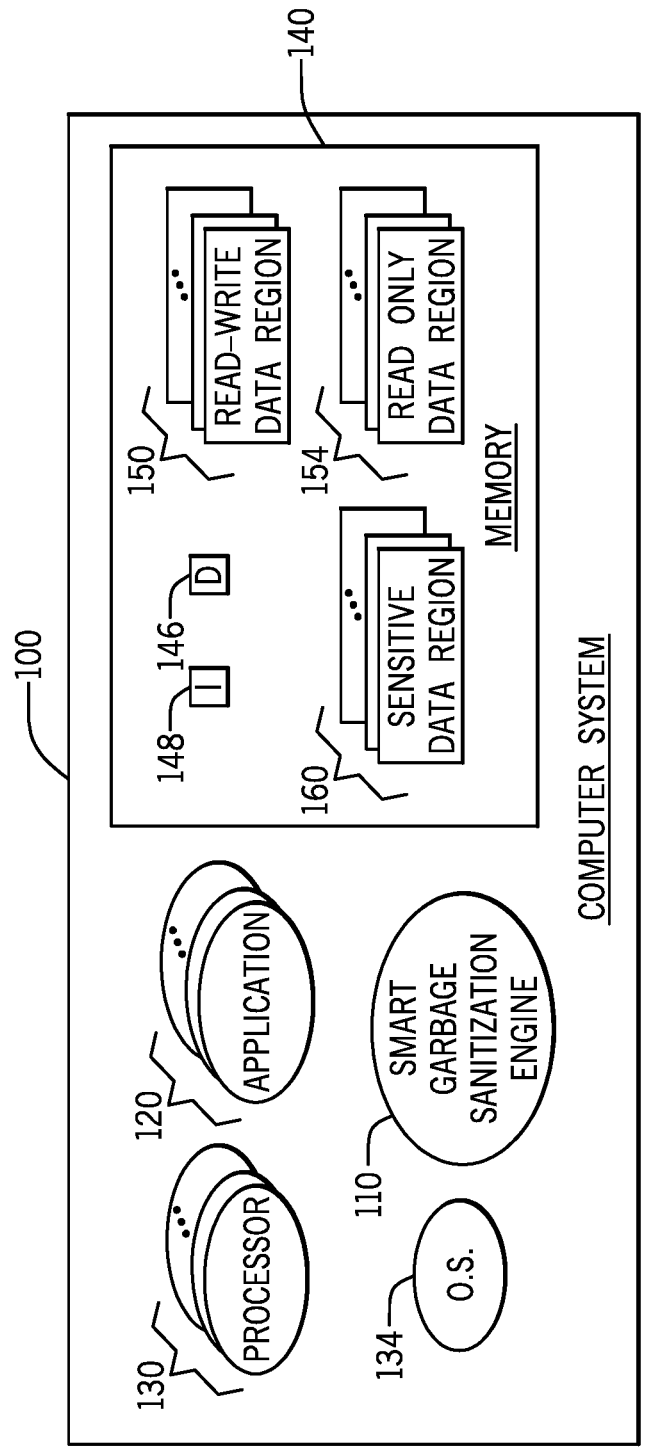
FIG. 1 is a schematic diagram of a computer system according to an example implementation.

Data scavenging and insider attacks are on the rise, and these attacks may exploit certain operations that occur in the execution of programs that collect and/or process data representing sensitive information. Due to these factors and governmental regulations (such as the General Data Protection Regulation (GDPR), for example) that place the burden of maintaining the privacy of personally identifiable information (PII) data on organizations that collect, store and process the PII data, maintaining the privacy of the data has become increasingly important. In the context of this application, PII data is one type of "sensitive data," and "sensitive data," in the context of this application, refers to any data that represents information that has an associated restricted access, including data that represents PII (social security numbers, phone numbers, driving license numbers, salaries, health records, and so forth) and data that represents secret or confidential information for an individual or for a business organization.

Sensitive data may potentially be revealed through a number of different mechanisms, such as a memory core dump and log files. In general, a memory core dump (also called a "core dump") refers to the recorded state of a computer system's memory at a particular time, such as when an application abnormally terminates. In this context, the "abnormal termination" of an application or process refers to the unplanned ending of the application's or process' execution due to an error that is not scripted by program code of the application or process, such as unplanned ending of the application or process due to a "crash."

A memory core dump may be triggered by the abnormal terminal of an application or process, and the memory core dump may potentially reveal sensitive data, if not for the measures that are described herein. For example, a memory core dump may be triggered by the abnormal termination of a database program that access health records (thereby, for example, potentially creating a memory dump that exposes health records) or a database program that processes employee records (thereby, for example, potentially creating a memory dump that exposes sensitive employee information, such as salaries, home addresses, social security numbers, and so forth). Rogue software (via kernel level attacks, a virus, malware, and so forth) may capture sensitive data from the memory core dump, unauthorized personnel may, through certain actions taken on the computer system, access sensitive data provided by the memory core dump, and so forth.

A memory core dump, in general, may be triggered in response to a software error, or exception, which is generated when a process or application abnormally terminates. Although a memory core dump may be used for legitimate reasons, such as analyzing application states, data structures, variables, inputs, and so forth for purposes of debugging an application, the memory core dump may also be used to exploit sensitive data for unauthorized purposes. The sensitive data may be identified in the memory core dump by the data's format, its associated data structure, or other contextual information that may be gleaned from the memory dump content.

Sensitive data that is stored in a memory of a computer system may be revealed in ways other than through a memory core dump. For example, a particular executing parent process in the computer system may abnormally terminate and leave one or multiple orphan processes (i.e., processes that were created by the now terminated parent process and remain executing, even though the parent process has terminated). The orphan processes, in turn, may have associated memory spaces that may contain sensitive data associated with the orphan process(es) and the parent process.

As another example of a way in which sensitive data in a computer system may be revealed, a modern computer system may have a persistent memory (non-volatile memory) in which data structures that are created and used by processes remain after the processes terminate. As another example, key stroke logging may result in sensitive data being stored in accessible computer memory or in log files. In this manner, the key stroke logging data may represent logged, or recorded, key strokes that were used to enter credit card information, user credentials or other sensitive information in the computer as an input. Keystroke logging may also, for example, record data that represents commands that are entered on the computer and may, for example, represent a way to bypass security implementations on the computer.

Regardless of how the sensitive data is derived, the sensitive data may be exploited by software attacks (kernel level attacks, advanced malware, viruses, and so forth) and/or by rogue unauthorized computer users. With increasing risk of advanced persistent threats (APT) and other sophisticated attacks, there are ample opportunities for the attacks to exploit access to sensitive data.

In accordance with example implementations that are described herein, an operating system service, called a "smart garbage sanitization engine," launches (i.e., being execution) in response to the occurrence of a software exception in a computer system. As described herein, the smart garbage sanitization engine masks, or sanitizes, data (i.e., "sensitive data"), which corresponds to sensitive information. In this context, the masking, or sanitizing, of the sensitive data refers to obscuring the sensitive data to prevent the sensitive information represented by the original, unsanitized data, from being recognized. As examples, sanitizing a given unit of data (a byte of data, a word of data, and so forth) may involve replacing the data unit with a pseudonym, encrypting the unit of data, and so forth.

Moreover, the sanitization, in accordance with some implementations, may be irreversible, i.e., a reverse transformation may not be available to apply to the sanitized unit of data to recover the original unsanitized data unit. As examples, the smart garbage sanitization engine may, for a unit of data to be sanitized, replace the data unit with a pseudonym that has no relation to the original data it replaces, apply a one way hash function to the unit of data to be sanitized to generate corresponding sanitized data, or encrypt the unit of data to be sanitized using a key, which is not available to decrypt the encrypted sanitized data.

In accordance with further example implementations, the sanitization may be reversible. For example, in accordance with further example implementations, a particular key may be used to encrypt the sensitive data, the key may be safeguarded, and with appropriate credentials, the key may be retrieved and used to decrypt the sanitized data to recover the corresponding sensitive data.

In accordance with example implementations, a sanitized data unit may have the same format as the corresponding unsanitized data unit it replaces. As an example, sensitive data that represents a sixteen digit credit card may be sanitized by replacing the data with sanitized data that represents another sixteen digit number (but not the original credit card number). As other examples, format preserving encryption (FPE), a hash function, a pseudonymization function and so forth, may be used for purposes of performing the format preserving sanitization. The preservation of format allows legitimate uses of the memory data (debugging, for example) that rely on understanding the type of data (understanding that the data is the type that represents a credit card, for example) without revealing the actual sensitive information (without revealing the actual credit card number, for example).

In general, the use of the operating system service (i.e., the smart garbage sanitization engine) to perform sanitization of sensitive data recognizes that software interrupts, or exceptions, are indicators that sensitive data of the computer system may be exposed. As examples, an exception may be generated in response to the abnormal terminal of an application, which triggers a memory core dump; an exception may be generated by abnormal termination of a parent process, leaving an orphan process and its memory exposed; and so forth.

In accordance with example implementations, the smart garbage sanitization engine is registered with the operating system to handle certain exceptions, such as exceptions that occur when an application or process abnormally terminate. When an exception for which the smart garbage sanitization engine is registered occurs, the engine reads information from an encrypted mapping file to identify one or multiple memory regions in which sensitive data is stored. In this manner, the memory may contain regions in which non-sensitive data is stored, and designated memory regions (represented by the encrypted mapping file) in which sensitive data is stored.

In accordance with example implementations, compiler directives may be used to identify sensitive variables and data structures in particular uncompiled program code so that a loader for the compiled code stores the variables and data structures that have been identified by the compiler directives as being "sensitive data" into one or multiple designated sensitive data regions of the memory. As such, in accordance with example implementations, the sensitive data may be protected using an operating system service and compiler/loader functionality.

Moreover, as further described herein, compiler flags may be used to set various options (appearing in the compiled binary code) for the sanitization. The compiler flags may, in accordance with example implementations, represent, or indicate, a policy (also called a "security policy" herein) for sanitization cleanup when an exception occurs. As examples, the policy may specify certain actions to be performed in connection with the masking that is used to obscure, or mask, sensitive data values in the sanitization process, such as the type of sanitation to be performed, such as the type of masking (zeroing, encryption or pseudonymization, as examples) and whether to preserve the formats of the individual items (using format preserving encryption, for example) or whether to mask the entire sensitive data region. The policy may also set forth the types, or categories, of event triggers, such as whether to trigger the sanitization process in response to an exception that occurs due to abnormal termination of an application or process, an exception that occurs due to the termination of a parent process that leaves an orphan process, an exception that occurs due to a memory core dump, and so forth.

In accordance with some implementations, the specific memory locations of the sensitive data regions may be randomized or pseudorandomized. In accordance with some implementations, the sensitive data regions may be secure enclaves, which are private regions of memory (enclaves) that are protected via specific microprocessor instructions (software guard extension instructions, for example).

As a more specific example, FIG. 1 depicts a computer system 100 in accordance with some implementations. In general, the computer system 100 includes one or multiple actual, physical machines that include actual hardware and machine executable instructions (or "software"). In this manner, the computer system 100 may include such hardware as one or multiple hardware processors 130 (one or multiple central processing units (CPUs), one or multiple CPU cores, and so forth); and a memory 140. In general, the memory 140 is a non-transitory memory that includes memory storage devices that may be associated with different types of memory storage device technologies, such as semiconductor storage devices, phase change storage devices, magnetic storage devices, memristor-based storage devices, a combination of storage devices associated with memory storage technologies, other storage device technologies, and so forth.

In accordance with example implementations, the memory 140 stores data 146, and this data may be stored in various regions of the memory 140, depending on the particular type, or category, of the data. For example, in accordance with some implementations, the memory 140 has one or multiple designated sensitive data regions 160. In accordance with example implementations, a sensitive data region 160 refers to a contiguous region of memory (a memory page, for example), which stores sensitive data, i.e., data representing sensitive information. In accordance with some implementations, the sensitive data regions 160 are secure enclaves, which are created through the use of specific microprocessor instructions.

As described herein, upon occurrence of a software exception of an application or process associated with a given sensitive data region 160, a smart garbage sanitization engine 110, an operating system service, performs actions to sanitize the contents of the associated sensitive data region (s) 160. The "sanitization" refers to the obscuring, or masking, of the sensitive data, such that the masked data does not reveal the sensitive information. As examples, the masking may refer to encryption, pseudonymization (replacing the sensitive data with pseudonyms which have no relationship to the underlying sensitive information), zeroing (replacing the sensitive data with zeros or other predefined character sequences), and so forth. The particular policy (also called a "security policy" herein) that controls the type of masking may be controlled by compiler directives, as further described herein.

It is noted that, in accordance with example implementations, the memory 140 may contain sensitive data regions 160 that are associated with multiple applications and/or processes, and the memory 140 may contain regions that are not associated with sensitive data, such as, for example, one or multiple read only data regions 154, one or multiple read-write data regions 150, and so forth. Moreover, in addition to the data 146 that may be stored in the above-described data regions, the memory 140 may also include machine executable instructions 148 that may be executed by one or multiple processors 130 to form the components of the computer system 100, such as the smart garbage sanitization engine 110, an operating system 134, one or multiple applications 120, and so forth.

It is noted that although the processors 130 are described as being associated with CPUs or CPU cores, in accordance with further example implementations, one or multiple processors of the computer system 100 may be formed from hardware circuits that do not execute machine executable instructions, such as application specific integrated circuits (ASICs), field programmable gate arrays (FPGAs), and so forth. Moreover, in accordance with example implementations, although the computer system 100 is an actual machine that is made up of actual hardware and software, the computer system 100 may have one or multiple virtual machines that execute on an underlying physical platform. Moreover, in accordance with example implementations, the components of the computer system 100 that are described herein, such as the smart garbage sanitization engine 110 may, in accordance with some implementations, execute on one of these virtual machines.

Although FIG. 1 illustrates the computer system 100 as being contained in a box, the computer system 100 may contain multiple machines, may be disposed in multiple racks, and so forth. Moreover, the computer system 100 may be disposed at a single geographical location or may be distributed over multiple geographical locations, depending on the particular implementation. As examples, the computer system 100 may be a desktop computer, a tablet computer, a notebook computer, a client, a server, a smartphone, a wearable computer, and so forth, depending on the particular implementation.

Figure 2:
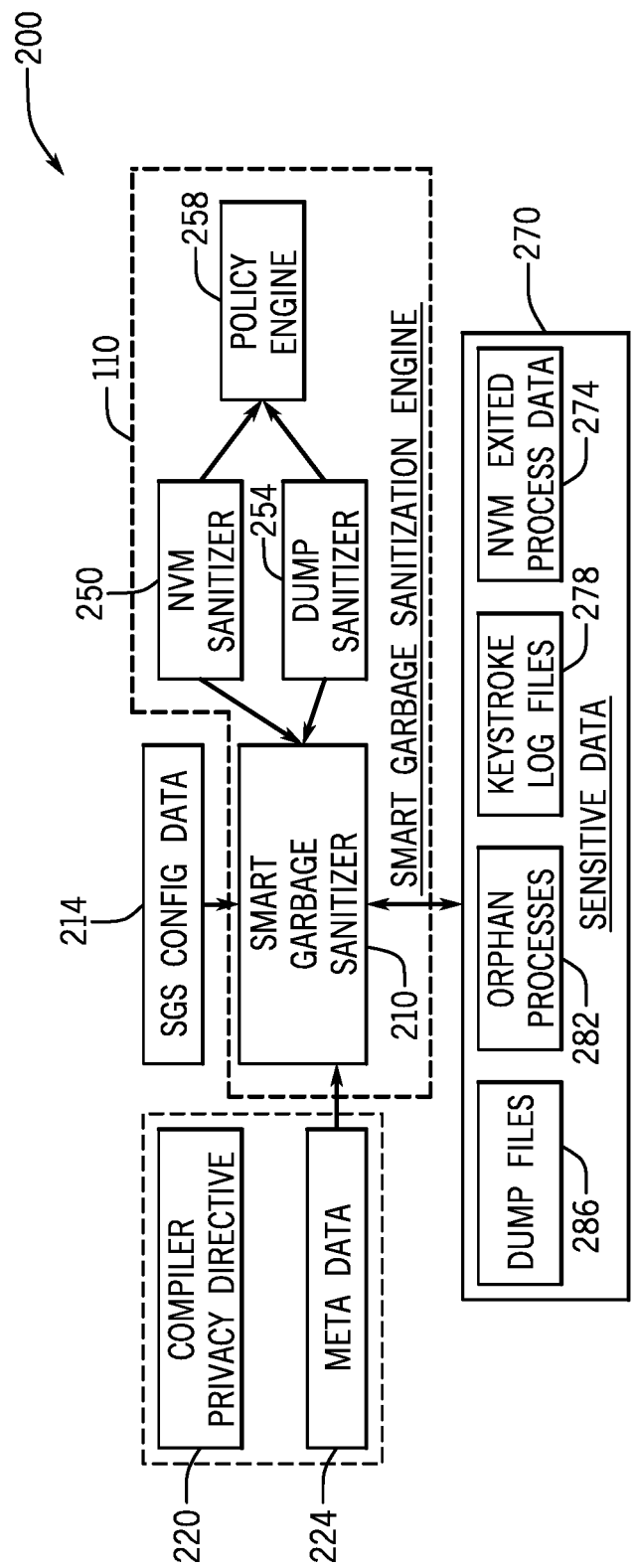
FIG. 2 is a schematic diagram illustrating an architecture for a smart garbage sanitization engine of FIG. 1, according to an example implementation.

Referring to FIG. 2 in conjunction with FIG. 1, in accordance with some implementations, the smart garbage sanitization engine 110 may contain a smart garbage sanitizer 210, which coordinates the overall operations of the smart garbage sanitization engine 110 and is called by the operating system 134 in response to an exception occurring in a particular processor application for which the smart garbage sanitization engine 110 is registered. In general, the actions taken by the smart garbage sanitizer 210 (whether the smart garbage sanitization engine 110 responds to orphan process exceptions, whether the smart garbage sanitization engine 110 responds to memory core dump exceptions, and so forth) may be controlled by smart sanitization configuration data 214. When an exception occurs, the operating system 134 calls the smart garbage sanitizer 210, and the smart garbage sanitizer 210 then uses the appropriate sanitization component to sanitize the sensitive data associated with the executing application or process.

For example, in accordance with some implementations, a memory core dump may be triggered by a software exception, and the smart garbage sanitizer 210 uses a dump sanitizer 254 to sanitize the data associated with the particular processor application. As another example, the smart garbage sanitizer 210 may be called in response to a parent process being abruptly terminated, and as a consequence, the smart garbage sanitizer 210 may use a non-volatile memory sanitizer 250 for purposes of sanitizing the corresponding region or regions of non-volatile memory containing the sensitive data. As depicted in FIG. 2, the actions taken by the non-volatile memory sanitizer 250 and dump sanitizer 254 may be controlled by a policy engine 258 of the smart garbage sanitization engine 110. In general, the policy engine 258 may set certain sanitization policies, such as which applications to sanitize, whether to enable the non-volatile memory sanitizer 250 for certain applications, whether to enable the dump sanitizer 254 for certain applications, whether to allow run time options set by an administrator to enable certain policies, the type of masking to be used, and so forth. In accordance with some implementations, compiler flags may be used to set one or more of these polices, as further described herein.

As depicted in FIG. 2, the data to be sanitized may include dump files 286, data 282 associated with orphan processes; data associated with keystroke log files 278, data associated with non-volatile memory due to an exited process 274; and so forth.

In general, the smart garbage sanitization engine 110 is an operating system service that is registered to be called by the operating system kernel in response to certain exceptions, such as exceptions pertaining to memory core dumps, termination of parent processes, and so forth. In general, the smart garbage sanitization engine 110 may be configured using a set of privacy data patterns and configuration information to recognize different types of patterns and apply the correct sanitization algorithms. For example, when a memory dump file is created or an orphan process is detected, based on a sanitization policy, the smart garbage sanitization engine 110 may detect sensitive information, such as email addresses, social security numbers, phone numbers, drivers' licenses, and other patterns; and sanitize the data using a format preserving data masking technique.

In accordance with some implementations, this format preserving data masking technique may be one that preserves the format of the underlying plaintext data. In this manner, as an example, if the social security number has nine digits, then, pursuant to the format preserving data masking, the masked data may also have nine digits. In accordance with some implementations, the format preserving masking may be format preserving encryption (FPE). In accordance with further example implementations, the format preserving masking may be a pseudonymization of the data.

As yet another example, in accordance with some implementations, the masked data may bear no relationship to the underlying sensitive data and as such, the masking may be irreversible. Due to the use of a format preserving masking, the data may still be useful for purposes of debugging and other purposes, without revealing the underlying sensitive information. In accordance with some implementations, a number or other identifier may be appended to the masked data to flag, or identify, that this data corresponded to data that has been masked. In accordance with further implementations, such an identifier may not be used. Moreover, in accordance with some implementations, format preserving masking may not be used, may be used for selected types of data, may be used for selected associated applications, may be used for memory core dump sensitive data masking and not for non-volatile memory masking, and so forth.

Figure 3:
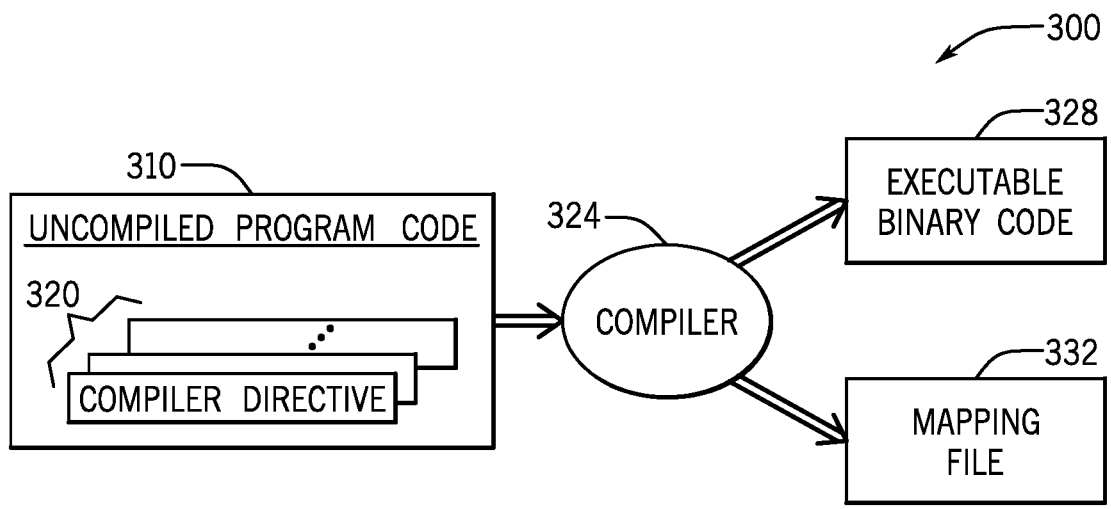
FIG. 3 is an illustration of the use of compiler directives to control the storage of sensitive information data in memory according to an example implementation.

As depicted in FIG. 2, in accordance with some implementations, the smart garbage sanitizer 210 uses metadata 224 for purposes of identifying the regions of memory containing sensitive information. Moreover, in accordance with some implementations, the metadata 224 may be formed from compiler privacy directives 220. In this manner, referring to FIG. 3 in conjunction with FIG. 2, in accordance with some implementations, a compiler 324 may compile uncompiled program code 310, which contains one or multiple compiler directives 320. The compiler directives 320 allow sections of program code that corresponds to sensitive data and security policies (e.g., directs the data to be stored in corresponding sensitive data regions 160) at compilation time. In general, the compiler directive 320 qualifies a particular variable or data structure as being "sensitive" during a definition phase for the uncompiled program code. In accordance with example implementations, a variable or data structure that has been designated as being "sensitive" by the compiler directive 320 is stored by a loader into a sensitive data region 160 of the memory 140 to allow the non-volatile memory sanitizer 250 or dump sanitizer 254 to readily identify the sensitive data and therefore, sanitize the data.

In accordance with example implementations, the sensitive data regions 160 may be stored in contiguous memory regions, where their starting addresses are randomly generated or pseudorandomly generated addresses within the available memory space of the memory 140, for purposes of reducing targeted attacks, which exploit buffer overflow vulnerabilities. In other words, in accordance with example implementations, the randomness of the sensitive data region locations obscures where the sensitive data is stored. Moreover, in accordance with some implementations, the memory addresses associated with the sensitive data regions 160 may be stored in a mapping file 332, and the mapping file 332 may be encrypted using a key that is provided by the operating system 134.

In general, in accordance with some implementations, the smart garbage sanitization engine 110 may support the attaching of an encrypted file with sensitive region or compiler directive information of any associated binary code, thereby providing an alternative to having such information as part of the shipped binary code. This allows a fool-proof method of masking the sensitive information as part of exceptions with a relatively high accuracy and aids in secure exception handling while reducing the attack surface.

Figure 4:
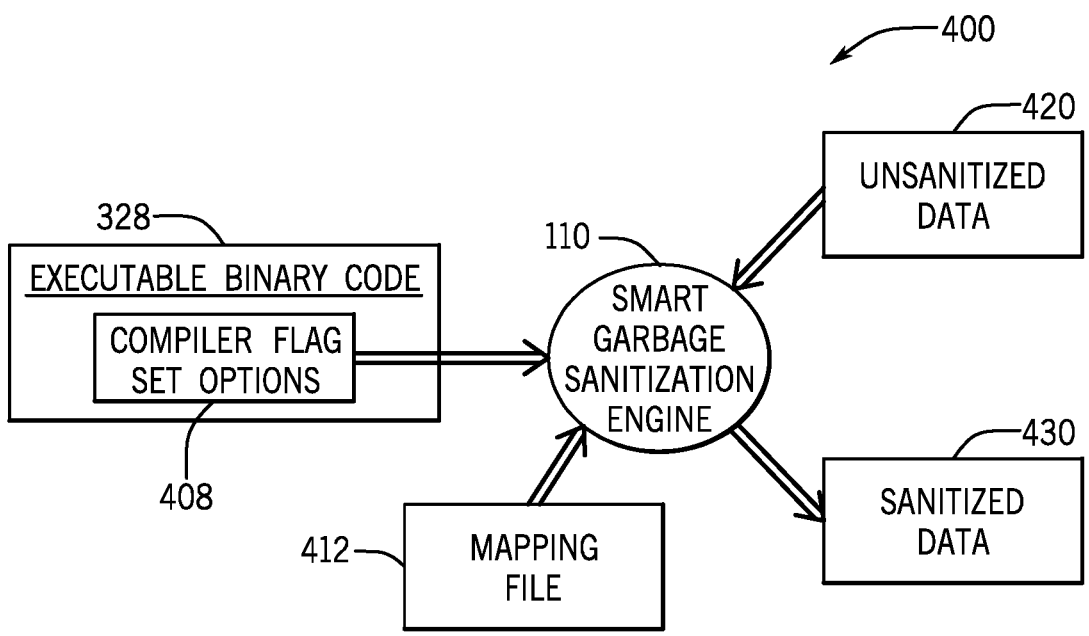
FIG. 4 is an illustration of use of compiler flags to control sanitization options according to an example implementation.
Figure 5:
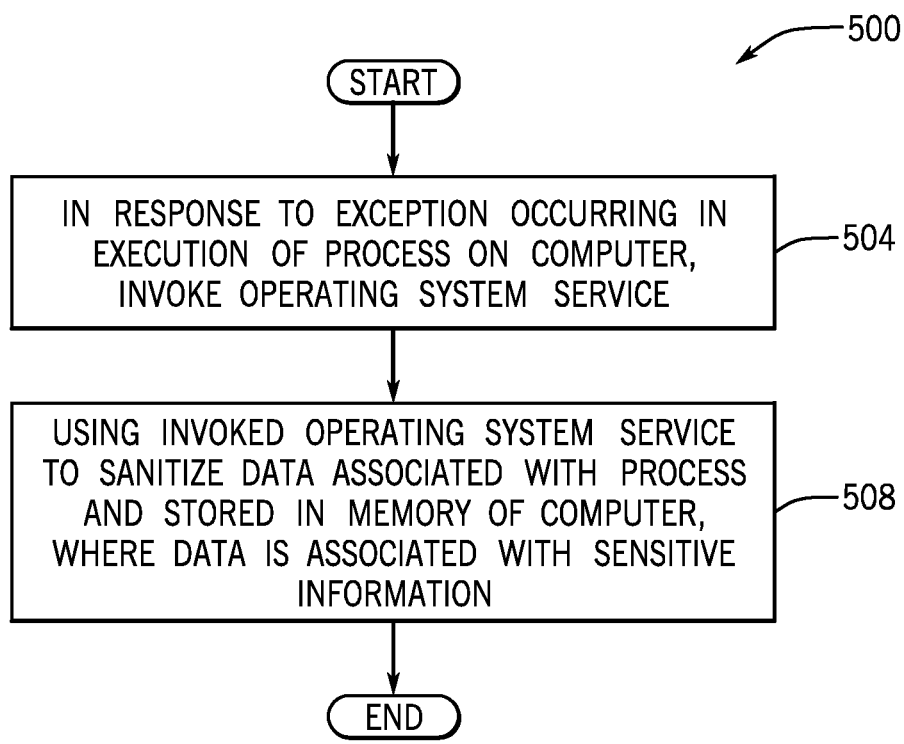
FIG. 5 is a flow diagram depicting a technique to sanitize data associated with a process on a computer according to an example implementation.

Referring to FIG. 4 in conjunction with FIG. 2, in accordance with some implementations, the executable binary code 328 may contain options 408 that are set by corresponding compiler flags. The options 408, in turn, may be recognized by the smart garbage sanitizer 210 (from the binary code) for purposes of identifying options with the sanitization, such as, the type of sanitization masking); whether to use format preserving masking for individual sensitive data values; whether to mask the entire sensitive data region without using format preserving masking for individual sensitive data values; the types, or categories, of sanitization (whether to sanitize orphan process data 282, key stroke log file data 278, dump file data 286 and/or non-volatile memory data 274); and so forth. Therefore, as depicted in FIG. 4, the smart garbage sanitizer 110 may consider the options 408 (as appearing in the compiled binary code) and the mapping file 412 to locate unsanitized data 420 and apply the appropriate sanitization masking to produce sanitized data 430.

Thus, in accordance with example implementations, a technique 500 includes, in response to an exception occurring in the execution of a process on a computer, invoking (block 504) an operating system service. The operating system service is used (block 508) to sanitize data that is associated with the process and is stored in a memory of the computer. The data is associated with sensitive information.

Figure 6:
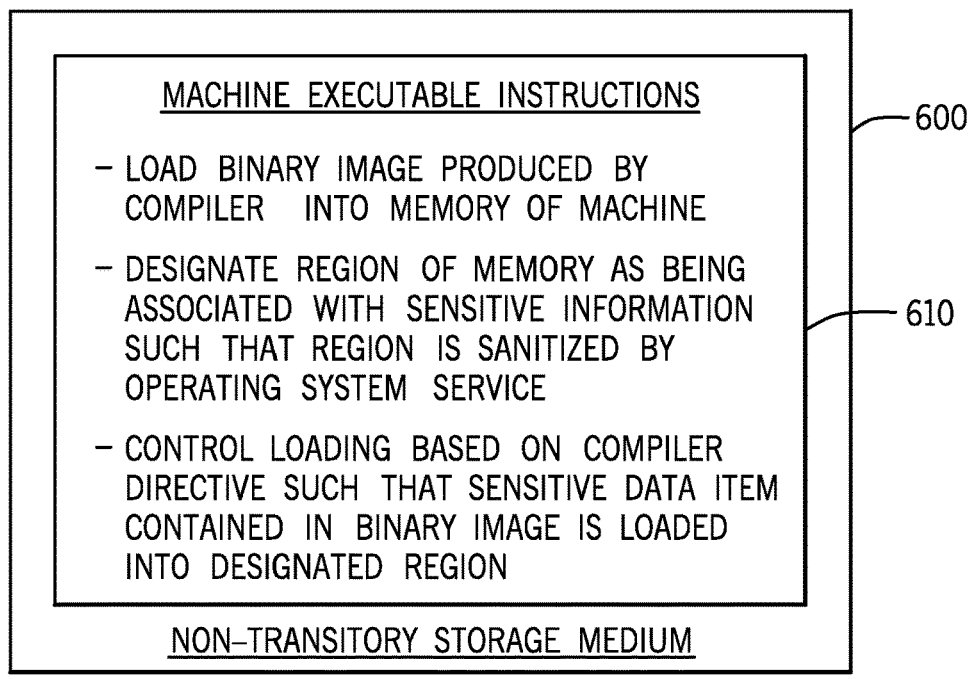
FIG. 6 is an illustration of machine readable instructions that cause a machine to control loading of sensitive data into a designated region of memory according to an example implementation.

Referring to FIG. 6, in accordance with example implementations, a non-transitory machine readable storage medium 600 stores instructions 610 that, when executed by a machine, cause the machine to load a binary image that is produced by a compiler into a memory of the machine; designate a region of the memory as being associated with sensitive information, such that the region is sanitized by an operating system service; and control the loading based on a compiler directive such that a sensitive data item contained in the binary images is loaded into the designated region.

Figure 7:
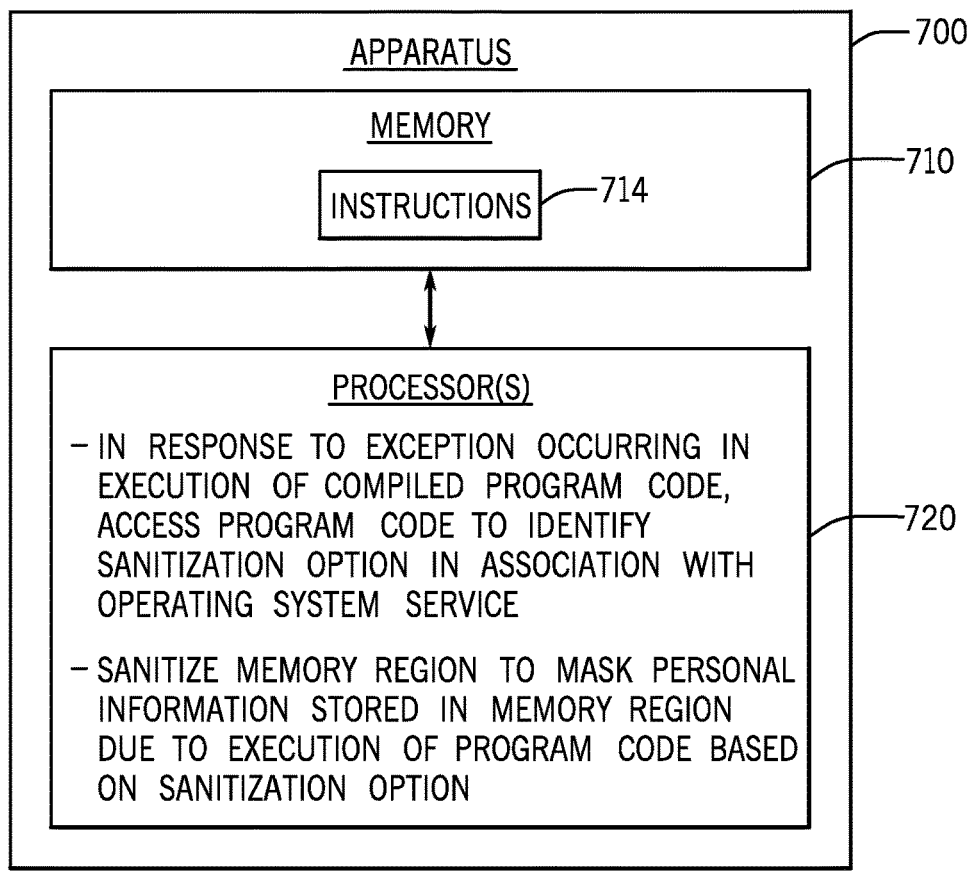
FIG. 7 is a schematic diagram of an apparatus to sanitize a memory region to mask personal information according to an example implementation.

Referring to FIG. 7, in accordance with example implementations, an apparatus 700 includes at least one processor 720 and a memory 710. The memory 710 stores instructions 714 that, when executed by the processor(s) 720, cause the processor(s) 720 to, in response to an exception occurring in the execution of compiled program code, access the program code to identify a sanitization option in association with an operating system service. The instructions 714, when executed by the processor(s) 720, cause the processor(s) 720 to sanitize a memory region to mask personal information stored in the memory region due to execution of the program code based on the sanitization option.

In the context of the application, a "pseudorandomly" generated address for the sensitive data region 160 value refers to an address based on a value that is nearly randomly generated, such as, for example, through the use of seed-based generator, which provides a pseudorandom value at its output. As examples, a seed value for the seed-based generator may be derived from a state or condition at the time the pseudorandom value is to be generated, such as input provided by real time clock (RTC) value, a counter value, a measured noise value, a register value, and so forth. The seed-based generator may be a polynomial-based generator, which receives a seed value as an input, applies a polynomial function to the seed value and provides an output (digital data, for example) that represents a pseudorandom value.

In the context of the application, a "randomly" generated address for the sensitive data region 160 value refers to an address based on a value that is based on a true random number. For example, a true random number generator may include an analog-to-digital converter (ADC) that provides a random digital output; and the ADC may sample a truly random analog signal, such as a thermal noise signal (a Johnson-Nyquist noise signal that is provided by a resistor, for example) or an atmospheric noise signal that is received by an antenna.

In accordance with example implementations, invoking an operating system service to sanitize data in response to an exception occurring in the execution of a process on a computer may involve one or more of the following. Invoking the operating system service may include sanitizing data associated with a memory core dump associated with the process, which prevents the memory core dump from being used to reveal sensitive information that is represented by the data.

The exception may occur in response to the process abnormally terminating; another process executing on the computer may be orphaned due to the process terminating; and invoking the operating system service may include invoking the operating system service to sanitize data that is associated with the orphaned process. Invoking the operating system service to sanitize data that is associated with the orphaned process prevents the memory space that is associated with the orphaned process from being accessed to reveal sensitive information that is represented by data stored in the memory space.

Using invoked operation system service to sanitize the data may include reading data from an encrypted mapping information file associated with the process, where the read data represents a region of the memory designated as containing sensitive data; and processing data in the region of the memory to sanitize the data. Containing sensitive data within regions of memory has an advantage of efficient access to the sensitive data for purposes of sanitizing the sensitive data.

Using the invoked operating system service to sanitize the data may include encrypting the data, which has the advantage of obscuring the data so that underlying sensitive information that is represented by the data is not revealed.

Using the invoked operating system service to sanitize the data may include processing the data to identify a unit of data having a format associated with sensitive data; and processing the unit of data to replace the data of the unit with masked data and preserve the format. Preserving the format of the data may be beneficial for later analysis (such as debugging, for example) of a memory core dump, which allows the type of data (now masked data) to be inferred.

Invoking the operating system service may include sanitizing data associated with a key stroke log file. This has the advantage of preventing unauthorized access to key stroke data, which may reveal sensitive information entered into a computer via key strokes.

The process may be associated with a binary image; and using the invoked operation system service to sanitize the data may include accessing the binary image to identify an option associated with the sanitizing and sanitizing the data based on the option. This has the advantage of allowing the binary image and options to be included in a single, portable package.

The option associated with the sanitizing may represent whether the sanitizing is to encrypt the data, mask the data without encryption, use format preserving sanitation, or sanitize a region of the memory associated with sensitive information. This has the advantage of allowing the binary image and the type of sanitization to be include in a single, portable package.

Invoking the operating system service may include sanitizing data associated with a non-volatile memory. This has the advantage of preventing unauthorized access to persistent sensitive data, which survives the process that created the data.

Instructions, when executed by a machine, may cause the machine to randomly or pseudorandomly designate a region of the memory as being associated with sensitive information. This has the advantage of obscuring the location of a sensitive data containing region of memory as another layer to prevent unauthorized access to the sensitive data.

Instructions, when executed by a machine, may cause the machine to store data in a mapping file identifying a location of the region of the memory of the sensitive data. This allows an operating system service to efficiently access sensitive data for sanitization.

While the present disclosure has been described with respect to a limited number of implementations, those skilled in the art, having the benefit of this disclosure, will appreciate numerous modifications and variations therefrom. It is intended that the appended claims cover all such modifications and variations

What is claimed is:

1. A method comprising:
in response to an exception occurring in an execution of a process on a computer, invoking an operating system service, wherein the process is associated with a binary image; and
using the invoked operating system service to sanitize data associated with the process and stored in a memory of the computer, wherein the data is associated with sensitive information, and using the invoked operating system service to sanitize the data comprises:
accessing the binary image, wherein the accessing comprises accessing a part of the binary image, and the part of the binary image identifies an option representing a type of the sanitization; and
responsive to the identification of the option representing the type of the sanitization, sanitizing the data.

2. The method of claim 1, wherein invoking the operating system service comprises invoking the operating system service to sanitize data associated with a memory core dump associated with the process.

3. The method of claim 1, wherein:
the exception occurs in response to the process abnormally terminating;
another process executing on the computer is orphaned due to the process terminating; and
invoking the operating system service comprises invoking the operating system service to sanitize data associated with the orphaned process.

4. The method of claim 1, wherein using the invoked operation system service to sanitize the data comprises:
reading data from an encrypted mapping information file associated with the process, wherein the read data represents a region of the memory designated as containing sensitive data; and
processing data in the region of the memory to sanitize the data.

5. The method of claim 1, wherein using the invoked operating system service to sanitize the data comprises encrypting the data.

6. The method of claim 1, wherein using the invoked operating system service to sanitize the data comprises:
processing the data to identify a unit of data having a format associated with sensitive data; and processing the unit of data to replace the data of the unit with masked data and preserve the format.

7. The method of claim 1, wherein invoking the operating system service comprises invoking the operating system service to sanitize data associated with a key stroke log file.

8. The method of claim 1, further comprising:
accessing the binary image to identify a second option representing whether formats of individual items represented by the data are to be preserved in the sanitization; and
sanitizing the data according to the second option.

9. The method of claim 1, wherein the option represents whether the sanitizing is to encrypt the data, mask the data without encryption, use format preserving sanitation, or sanitize a region of the memory associated with sensitive information.

10. The method of claim 1, wherein invoking the operating system service comprises invoking the operating system service to perform sanitizing data associated with a non-volatile memory.

11. The method of claim 1, wherein the sanitizing comprises sanitizing the data after accessing the binary image to identify the option.

12. The method of claim 1, wherein the binary image further comprises the data.

13. The method of claim 1, wherein:
accessing the binary image comprises a sanitization engine accessing the binary image to identify the option; and
sanitizing the data comprises the sanitization engine sanitizing the data.

14. A non-transitory storage medium to store machine readable instructions that, when executed by a machine, cause the machine to:
in response to a software exception occurring in an execution of a process on the machine, invoke an operating system service, wherein the process is associated with a binary image; and
use the invoked operating system service to sanitize data associated with the process and stored in a memory of the machine, wherein the data is associated with sensitive information, and using the invoked operating system service to sanitize the data comprises:
accessing configuration data, wherein the configuration data identifies whether the operating system service is to respond to the software exception being an orphan process exception and whether the operating system service is to respond to the software exception being a memory dump exception;
determining to respond to the software exception to sanitize the data responsive to the configuration data;
accessing the binary image, wherein the accessing comprises accessing a part of the binary image, and the part of the binary image identifies a plurality of options for the sanitization, wherein the plurality of options comprises an option representing a type of masking for the sanitization, an option whether to preserve formats of individual items of the sensitive data and an option whether to mask an entirety of the sensitive data; and
responsive to the identification of the plurality of options, sanitizing the data.

15. The storage medium of claim 14, wherein the instructions, when executed by the machine, further cause the machine to randomly or pseudorandomly determine a location for the region of the memory.

16. The storage medium of claim 14, wherein the instructions, when executed by the machine, further cause the machine to store data in a mapping file identifying a location of the region of the memory.

17. The storage medium of claim 16, wherein:
the instructions, when executed by the machine, further cause the machine to encrypt the data in the mapping file identifying the location of the region; and
the encryption is associated with a key used by the operating system service to sanitize data stored in the region in response to an exception occurring in execution of the binary image.

18. The storage medium of claim 14, wherein the instructions, when executed by the machine, further cause the machine to:
sanitize the data after accessing the binary image to identify the option.

19. An apparatus comprising:
at least one processor; and
a memory to store instructions that, when executed by the at least one processor, cause the at least one processor to:
in response to an exception occurring in execution of compiled program code, access a part of the program code, wherein the part identifies a sanitization option in association with an operating system service, wherein the sanitization option represents a type of masking to be used in the sanitization; and
responsive to the identification of the sanitization option, sanitize a memory region to mask personal information stored in the memory region due to execution of the program code.

20. The apparatus of claim 19, wherein the sanitization option represents whether the sanitizing is to encrypt the data, mask the data without encryption, use format preserving sanitation, or sanitize the entire memory region.

21. The apparatus of claim 19, wherein the instructions, when executed by the at least one processor, cause the at least one processor to access a mapping file to identify the memory region.

22. The apparatus of claim 21, wherein the mapping file comprises encrypted data representing a location of the memory region.

23. The apparatus of claim 19, wherein the sanitization option is created in the compiled program code by compiler in response to a compiler flag.

24. The apparatus of claim 19, wherein the instructions, when executed by the at least one processor, further cause the at least one processor to:
access the binary image to identify a second option representing a trigger for the sanitization; and
controlling initiation of the sanitization responsive to the second option.

25. The apparatus of claim 19, wherein the instructions, when executed by the at least one processor, further cause the at least one processor to sanitize the memory region to mask the personal information after identification of the sanitization option.

* * * * *